(12) United States Patent
Chang

(10) Patent No.: US 7,049,780 B2
(45) Date of Patent: May 23, 2006

(54) DOOR LOCK TRANSMISSION ELEMENT

(76) Inventor: Chia Jung Chang, No. 14, Alley 60, Lane 109, Fushan St., Bancio City, Taipei County (TW) 220

( * ) Notice: Subject to any disclaimer, the term of this patent is extended or adjusted under 35 U.S.C. 154(b) by 0 days.

(21) Appl. No.: 10/995,232

(22) Filed: Nov. 24, 2004

(65) Prior Publication Data
US 2005/0111118 A1     May 26, 2005

(30) Foreign Application Priority Data
Nov. 25, 2003   (TW) .............................. 92220794 U (51) Int. Cl.
*G05B 19/29*   (2006.01)

(52) U.S. Cl. .................... 318/602; 318/600; 318/34; 318/652; 318/625; 359/843

(58) Field of Classification Search ................ 318/34, 318/600, 602, 603, 625
See application file for complete search history.

(56) References Cited

U.S. PATENT DOCUMENTS

| | | | | |
|---|---|---|---|---|
| 4,828,361 A | * | 5/1989 | Alten et al. | 359/604 |
| 5,306,953 A | * | 4/1994 | Weiner | 307/10.1 |
| 5,668,675 A | * | 9/1997 | Fredricks | 359/843 |
| 5,719,713 A | * | 2/1998 | Brown | 359/843 |
| 5,896,235 A | * | 4/1999 | Valentino | 359/843 |
| 5,953,167 A | * | 9/1999 | Valentino | 359/843 |
| 5,953,168 A | * | 9/1999 | Valentino | 359/843 |
| 6,167,607 B1 | * | 1/2001 | Pryor | 29/407.04 |
| 6,193,380 B1 | * | 2/2001 | Jacobs | 359/843 |
| 6,217,177 B1 | * | 4/2001 | Rost | 359/843 |
| 6,302,547 B1 | * | 10/2001 | Valentino | 359/843 |
| 6,428,172 B1 | * | 8/2002 | Hutzel et al. | 359/838 |

FOREIGN PATENT DOCUMENTS

TW                 467051           12/2002

* cited by examiner

*Primary Examiner*—Rina Duda
*Assistant Examiner*—Erick Glass
(74) *Attorney, Agent, or Firm*—Shoemaker and Mattare (57) ABSTRACT

An auto-adjusting electric rear-view mirror includes at least two driving mechanisms for driving the rear-view mirror to deflect. The driving mechanisms are respectively coupled to servo control circuits that are further connected to sensor members. The servo control circuits are also coupled to a master control circuit that is further connected to an external controller. The sensor members can sense a positional variation of the rear-view mirror and send a feedback signal to the servo control circuits. The servo control circuits compare a signal from input ports thereof with the feedback signal, and output a control signal to the driving mechanisms according to the comparison result to drive position or negative rotation of the driving mechanisms, such that the rear-view mirror would automatically adjust its view angle to ensure driving safety.

15 Claims, 5 Drawing Sheets

DOOR LOCK TRANSMISSION ELEMENT

FIELD OF THE INVENTION

The present invention relates to auto-adjusting electric rear-view mirrors, and more particularly, to an electric rear-view mirror of a car, which can be automatically and synchronously driven to adjust its view angle according to a turning angle of a steering wheel and operation of a switch of an indicator so as to allow the rear-view mirror to automatically return to an original view angle or a preset view angle such that visually blind spots or blind angles during turning or backing of the car can be eliminated.

BACKGROUND OF THE INVENTION

For a general vehicle, such as a car, during turning or backing thereof, a driver must keep watching right and left side rear-view mirrors and an interior rear-view mirror to obtain situations around right, left and back sides of the car to ensure driving safety. However, conventional rear-view mirrors whether they are manually or electrically adjustable are fixed at predetermined positions of the car. Even the electric rear-view mirrors can only allow the driver to adjust view angles thereof through an electric means. When the driver is turning or backing the car, the view angle of the rear-view mirror may change or decrease along with the movement of the car, thus causing visually blind spots that make the driver not able to realize all situations around the car and adversely affect the driving safety.

In order to overcome the above drawback that the conventional electric rear-view mirror cannot change its view angle along with the movement of the car, Taiwanese Patent No. 467051 has disclosed an automatically controlling device for view angles of rear-view mirrors of a car. This device comprises two sets of direct current (DC) motors for respectively driving right and left side rear-view mirrors, wherein each of the DC motors is connected to a control circuit, and the two control circuits are operationally coupled to switches of indicators associated with a steering wheel respectively. When a driver operates or switches on one of the indicator switches for turning the car, the corresponding control circuit would be actuated to drive the DC motor to deflect the corresponding side rear-view mirror in accordance with the turning angle of the car, such that a view angle of the side rear-view mirror can be increased and blind spots can be reduced during turning of the car. When the turning is complete and the car goes straight, the indicator switch automatically reverts to an off state, and the control circuit drives the DC motor to restore the side rear-view mirror to an original view angle. This thus improves the driving safety.

Every time when the driver switches the indicator on, the side rear-view mirror would be correspondingly driven to deflect. However, the indicator may be operated frequently during driving of a whole day, thereby resulting in frequent movements of the side rear-view mirror. Such frequent movements would cause the side rear-view mirror to deviate from an originally set view angle or not able to return to the originally set view angle. If the deviation in view angle is not significant, it may not cause a great effect on driving. On the contrary, if this deviation of the view angle is sufficient to cause visually blind spots during driving, since the driver usually relies on images captured by the side rear-view mirror, the presence of blind spots would lead to driving unsafety.

Generally, a car is usually used by a regular driver. However, sometimes a person other than the regular driver may drive the car and needs to adjust rear-view mirrors to appropriate view angles since different persons have different body figures and different angles of watching the rear-view mirrors. When the car is returned to the regular driver, the rear-view mirrors should be re-adjusted by the regular driver to the view angles suitable for the regular driver, thus causing inconvenience and trouble to the regular driver.

In addition, if the regular driver does not notice that the rear-view mirrors have been adjusted by another person and replies on images captured by such rear-view mirrors that may have view angles not suitable for the regular driver, this would easily lead to visually blind spots for the regular driver and adversely affect the driving safety.

SUMMARY OF THE INVENTION

In light of the drawbacks in the prior art, a primary objective of the present invention is to provide an electric rear-view mirror for eliminating blind spots for a vehicle (such as a car and so on), allowing the rear-view mirror when deviating from a preset view angle to automatically return to the preset view angle, such that the rear-view mirror can effectively remove visually blind spots during turning or backing of the car.

Another objective of the present invention is to provide an auto-adjusting electric rear-view mirror that is synchronously driven to deflect to an appropriate view angle when a driver operates a steering wheel to turn a car, such that the rear-view mirror is operationally coupled to the steering wheel to eliminate visually blind spots during driving.

Still another objective of the present invention is to provide an auto-adjusting electric rear-view mirror that is synchronously driven to deflect to an appropriate view angle when a driver switches an indicator on to turn a car, such that the rear-view mirror is operationally coupled to the indicator switch to eliminate visually blind spots during driving and thus improve the driving safety.

A further objective of the present invention is to provide an auto-adjusting electric rear-view mirror, allowing its view angle to be set by a user and stored, such that the user can quickly return the rear-view mirror, after being adjusted, to the set view angle.

A further objective of the present invention is to provide an auto-adjusting electric rear-view mirror that can automatically return to a preset view angle if the rear-view mirror deviates from the preset view angle, such that the auto-adjusting electric rear-view mirror can effectively remove visually blind spots during turning or backing of a car.

A further objective of the present invention is to provide an auto-adjusting electric rear-view mirror, allowing multiple records of its view angle to be set and stored, such that different users may change the view angle of the rear-view mirror according to the stored records without the trouble and inconvenience to manually adjust the rear-view mirror.

In order to achieve the above and other objectives, the present invention proposes an auto-adjusting electric rear-view mirror including at least two driving mechanisms for driving the rear-view mirror to change a view angle thereof. Each of the driving mechanisms is connected to a servo control circuit for controlling positive and negative rotation of the corresponding driving mechanism. The servo control circuits are respectively coupled to sensor members for sensing a positional variation of the rear-view mirror and correspondingly producing a feedback signal that is then transmitted to the servo control circuits respectively. The servo control circuits compare a signal from input ports thereof with the feedback signal to output a control signal to the driving mechanisms according to the comparison result. The servo control circuits are also connected to a master control circuit. The master control circuit is further coupled to an external controller, a key set and a display, wherein the external controller is connected to a first sensor for sensing a variation of a turning angle of a steering wheel axle and to a second sensor for sensing operating indication of an indicator switch.

The first and second sensors, respectively connected to the steering wheel axle and the indicator switch, output a feedback signal according to the sensing result respectively to the external controller. Correspondingly the external controller produces and transmits a control signal to the master control circuit according to the feedback signal. Then, the master control circuit transmits the control signal to the servo control circuits to allow the servo control circuits to drive positive or negative rotation of the driving mechanisms. As a result, the rear-view mirror would adjust its view angle according to the action of the external controller such that visually blind spots can be eliminated when a driver turns the steering wheel or operates the indicator switch.

Moreover, the sensor members can sense a positional variation of the rear-view mirror and send a feedback signal to the servo control circuits. The servo control circuits compare a signal from the input ports thereof with the feedback signal and output a control signal to the driving mechanisms according to the comparison result. This allows the view angle of the rear-view mirror to be automatically adjusted so as to prevent blind spots caused by mirror deviation.

Furthermore, the master control circuit is also connected to a key set. A control signal can be directly inputted via the key set to adjust the rear-view mirror to an appropriate view angle according to a user's requirement. The master control circuit also includes a memory, and setting parameters of the view angle of the rear-view mirror for the user can be stored in the memory. If the rear-view mirror is again adjusted, the setting parameters of view angle can be retrieved to allow the rear-view mirror to return to the preset angle for the user. Thus, the rear-view mirror can quickly return to the original angle position, thereby preventing the trouble or inconvenience to manually re-adjust the rear-view mirror.

Multiple sets of setting parameters can be set and stored for the view angle of the rear-view mirror being adjusted by different users, such that a particular set of the setting parameters would be retrieved for the corresponding user to adjust the rear-view mirror to a suitable angle position without having to manually re-adjust the rear-view mirror.

In addition, the master control circuit is further coupled to a display such that the users can find and read the angle setting parameters of the rear-view mirror of their own or other users via the display.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFFERED EMBODIMENT

Figure 1:
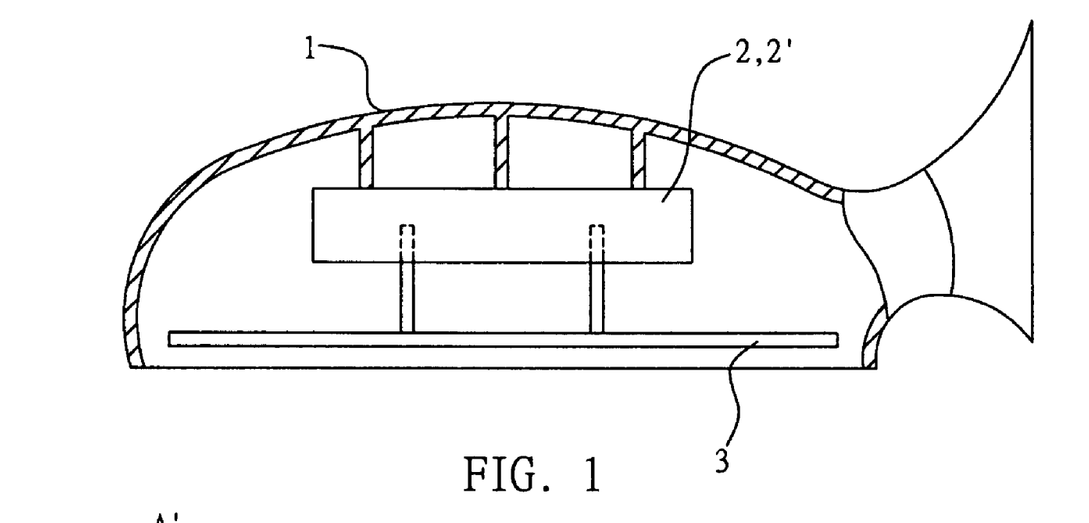
FIG. 1 is a cross-sectional view of an auto-adjusting electric rear-view mirror according to the present invention.

Referring to FIG. 1, it shows a cross-sectional view of an auto-adjusting electric rear-view mirror according to a preferred embodiment of the present invention. The auto-adjusting electric rear-view mirror is applicable to a vehicle (such as a car and so on), and serves as right side, left side and/or interior rear-view mirror(s). The auto-adjusting electric rear-view mirror includes a casing 1 having an opening 11, at least two driving mechanisms 2, 2' mounted in the casing 1, wherein the driving mechanisms 2, 2' can be Stepping Motors or AC Servo Motors, and a mirror member 3 provided in front of the driving mechanisms 2, 2' and at the opening 11. The mirror member 3 can be driven to turn or deflect by the driving mechanisms 2, 2' to reflect views and images around the car mounted with the auto-adjusting electric rear-view mirror.

Figure 2A:
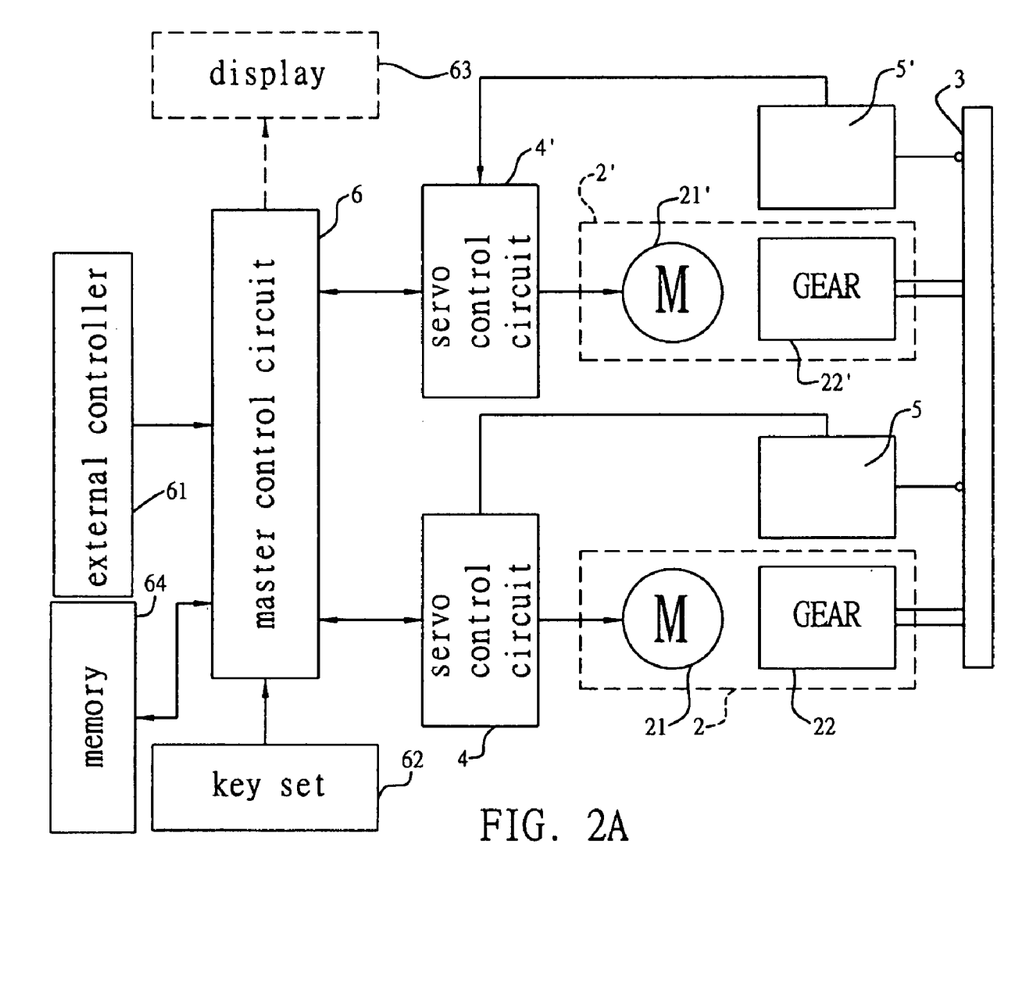
FIG. 2A is a schematic block diagram showing basic architecture of the auto-adjusting electric rear-view mirror according to a preferred embodiment of the present invention.
Figure 3:
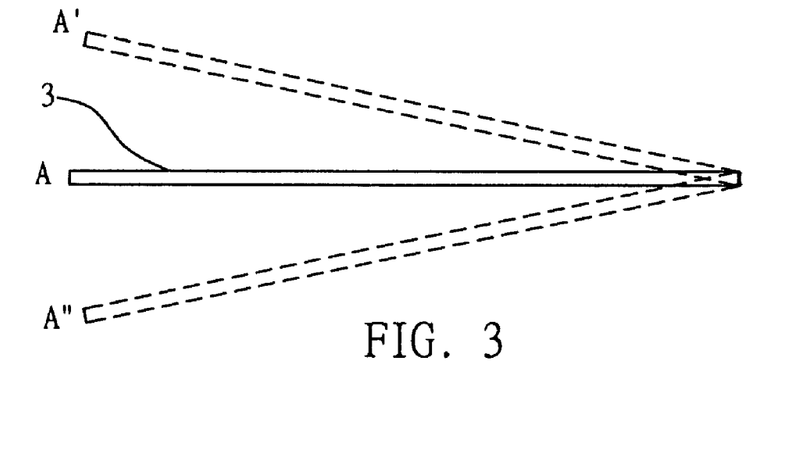
FIG. 3 is a schematic diagram showing deflecting positions of a mirror member of the auto-adjusting electric rear-view mirror according to the present invention.

Referring to FIG. 2A, it shows a block diagram of circuitry of the auto-adjusting electric rear-view mirror according to a preferred embodiment of the present invention. The two driving mechanisms 2, 2' are electrically connected to the mirror member 3. Each of the driving mechanisms 2, 2' comprises a motor 21, 21' and a gear set 22, 22', wherein the motors 21, 21' are slowed down by the gear sets 22, 22' to drive the mirror member 3 to turn or deflect, and the driving mechanisms 2, 2' can drive the mirror member 3 to swing in horizontal and vertical directions respectively. The motors 21, 21' of the driving mechanisms 2, 2' are respectively connected to servo control circuits 4, 4' for controlling positive and negative rotation of the motors 21, 21' such that the mirror member 3 can swing forwards or backwards. The servo control circuits 4, 4' are respectively connected to sensor members 5, 5' associated with the mirror member 3. The sensor members 5, 5' are used to sense a positional variation of the mirror member 3 and produce a feedback signal that is then transmitted to the servo control circuits 4, 4' respectively. The servo control circuits 4, 4' compare a signal from input ports thereof with the feedback signal to output a control signal to the motors 21, 21' of the driving mechanisms 2, 2' respectively. If the feedback signal is greater than the signal from the input ports, the control signal from the servo control circuits 4, 4' drives negative rotation of the motors 21, 21'. On the contrary, if the feedback signal is smaller than the signal from the input ports, the control signal from the servo control circuits 4, 4' drives position rotation of the motors 21, 21'. This allows the mirror member 3 when deviating to automatically return to a preset position, as shown in FIG. 3.

The servo control circuits 4, 4' are connected to a master control circuit 6, and the master control circuit 6 is further coupled to an external controller 61, a key set 62 and a display 63. The external controller 61 can be an indicator switch of the car. A control signal can be inputted via the external controller 61 to the master control circuit 6 and then transmitted from the master control circuit 6 to the servo control circuits 4, 4' so as to drive the positive or negative rotation of the motors 21, 21' of the driving mechanisms 2, 2'. When the indicator switch is operated for turning or backing the car, the mirror member 3 would automatically turn or deflect to provide a wider view angle and reduce visually blind spots during turning or backing of the car, thus improving the driving safety.

The key set 62 includes a direction key, a switch key and a save key. The direction key is provided to input a control signal to directly adjust an angle position of the mirror member 3. The switch key is provided to switch the use between the right side, left side and interior rear-view mirrors, such that a user may manually operate the direction key to adjust a view angle of the mirror member 3 of the selected rear-view mirror.

The master control circuit 6 includes a memory 64. After the mirror member 3 is adjusted by the user via the direct and switch keys of the key set 62, setting parameters of the view angle of the mirror member 3 are stored via the save key to the memory 64. If the mirror member 3 is adjusted again in view angle by manually operating the direction key, an instruction signal can be inputted via the key set 62 to retrieve the setting parameters of view angle that are stored in the memory 64, such that the servo control circuits 4, 4' would receive the stored setting parameters at the input ports thereof and compare values of the stored setting parameters with feedback values from the sensor members 5, 5', so as to output a control signal according to the comparison result to the driving mechanisms 2, 2' and return the mirror member 3 to the preset angle position for the user. This thus prevents the trouble and inconvenience to manually re-adjust the mirror member 3 back to the original position. If there are multiple users for the rear-view mirror, different sets of parameters for setting the view angle of the mirror member 3 can be stored in the memory 64 for different users respectively, and a corresponding set of the setting parameters can be retrieved for the corresponding user to adjust the mirror member 3 to the suitable angle position without having to manually re-adjust the mirror member 3.

The master control circuit 6 is also connected to the display 63 such as a monochromatic or color liquid crystal display, etc. The display 63 provides the user with search and setting functions, and allows the user to directly execute these functions via the display 63 without having to memorize the operating method of the rear-view mirror, as well as displays the setting parameters and the items to be stored.

The sensor members 5, 5' for sensing the positional variation of the mirror member 3 can be positional sensors (such as variable resistance, etc.). The positional members 5, 5' can convert a length variation of the movement of the mirror member 3 into a current or voltage signal that is then fed back to the servo control circuits 4, 4'. The servo control circuits 4, 4' would control the driving mechanisms 2, 2' according to intensity of the feedback signal. This controlling method refers to analog feedback control.

Alternatively, the sensor members 5, 5' may be counting sensors that create a feedback signal according to counting number of times (such as the times of rotation of the motors 21, 21', etc.) and transmit the feedback signal to the servo control circuits 4, 4'. This controlling method refers to digital feedback control.

Figure 2B:
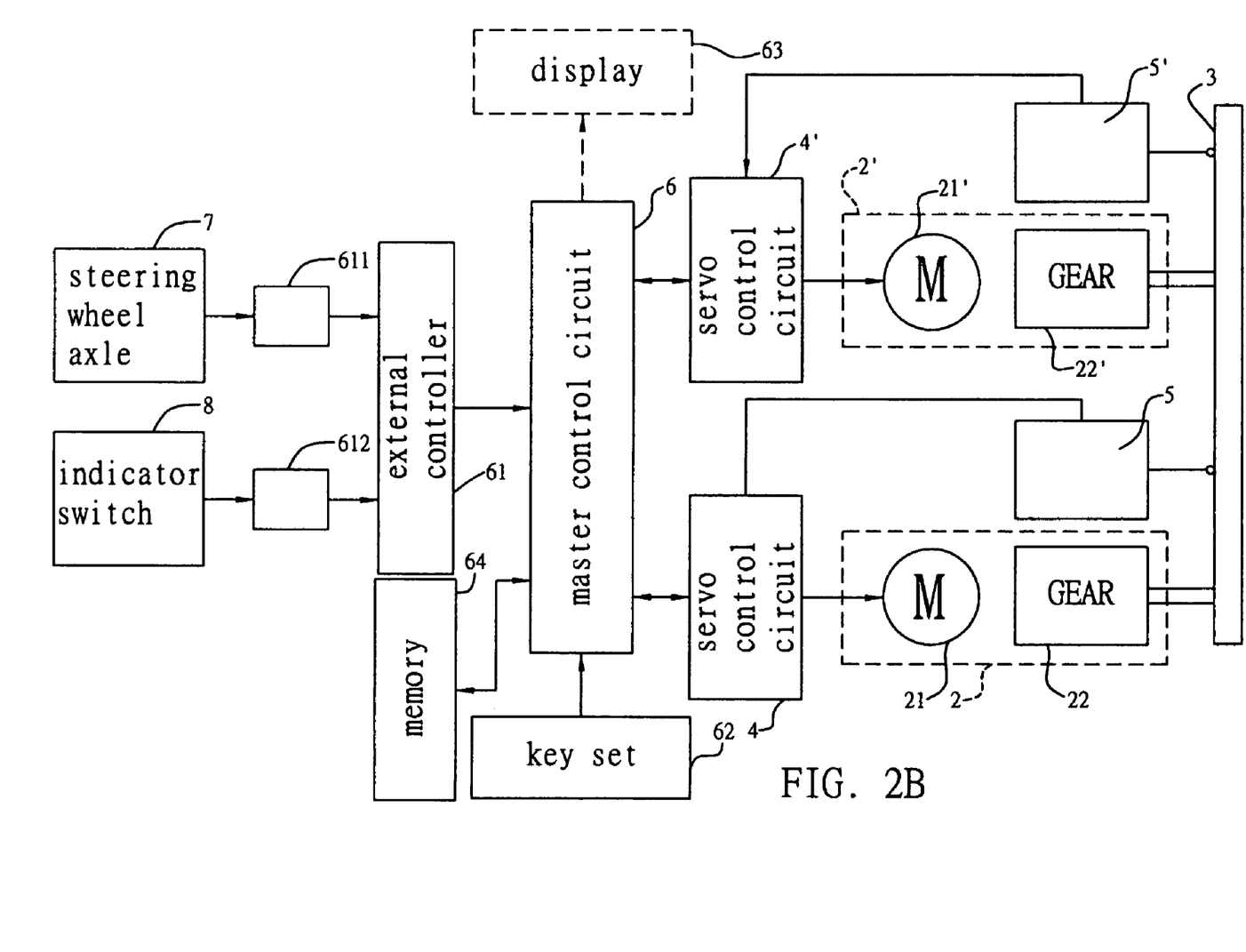
FIG. 2B is a schematic block diagram showing basic architecture of the auto-adjusting electric rear-view mirror according to another preferred embodiment of the present invention.

Referring to FIG. 2B, it shows a block diagram of basic architecture of the auto-adjusting electric rear-view mirror according to another preferred embodiment of the present invention. As shown in FIG. 2B, the external controller 61 connected to the master control circuit 6 is further coupled to a first sensor 611 that is connected to a steering wheel axle 7, and to a second sensor 612 that is connected to an indicator switch 8. The first sensor 611 is used to sense a variation of a turning angle of the steering wheel axle 7. The second sensor 612 is used to sense operating indication of the indicator switch 8. The first and second sensors 611, 612 respectively produce a feedback signal according to the sensing result and transmit the feedback signal to the external controller 61. The external controller 61 correspondingly outputs a control signal to the master control circuit 6 according to the feedback signal, and the master control circuit 6 transmits the control signal to the servo control circuits 4, 4' to drive positive or negative rotation of the motors 21, 21' of the driving mechanisms 2, 2'. As a result, when a driver of the car operates the steering wheel to change the turning angle of the steering wheel axle 7 for turning or backing the car and/or operates the indicator switch 8 to turn on the indicator, the mirror member 3 of the rear-view mirror would automatically turn or deflect to provide a wider view angle during turning or backing of the car, so as to prevent visually blind spots during turning or backing of the car and improve the driving safety.

The first sensor 611 for sensing the angle variation of the steering wheel axle 7 and the second sensor 612 for sensing the operating indication of the indicator switch 8 can be positional sensors (e.g. variable resistance, etc.), which may convert the sensed variation to a current or voltage signal that is then fed back to the external controller 61.

Figure 2C:
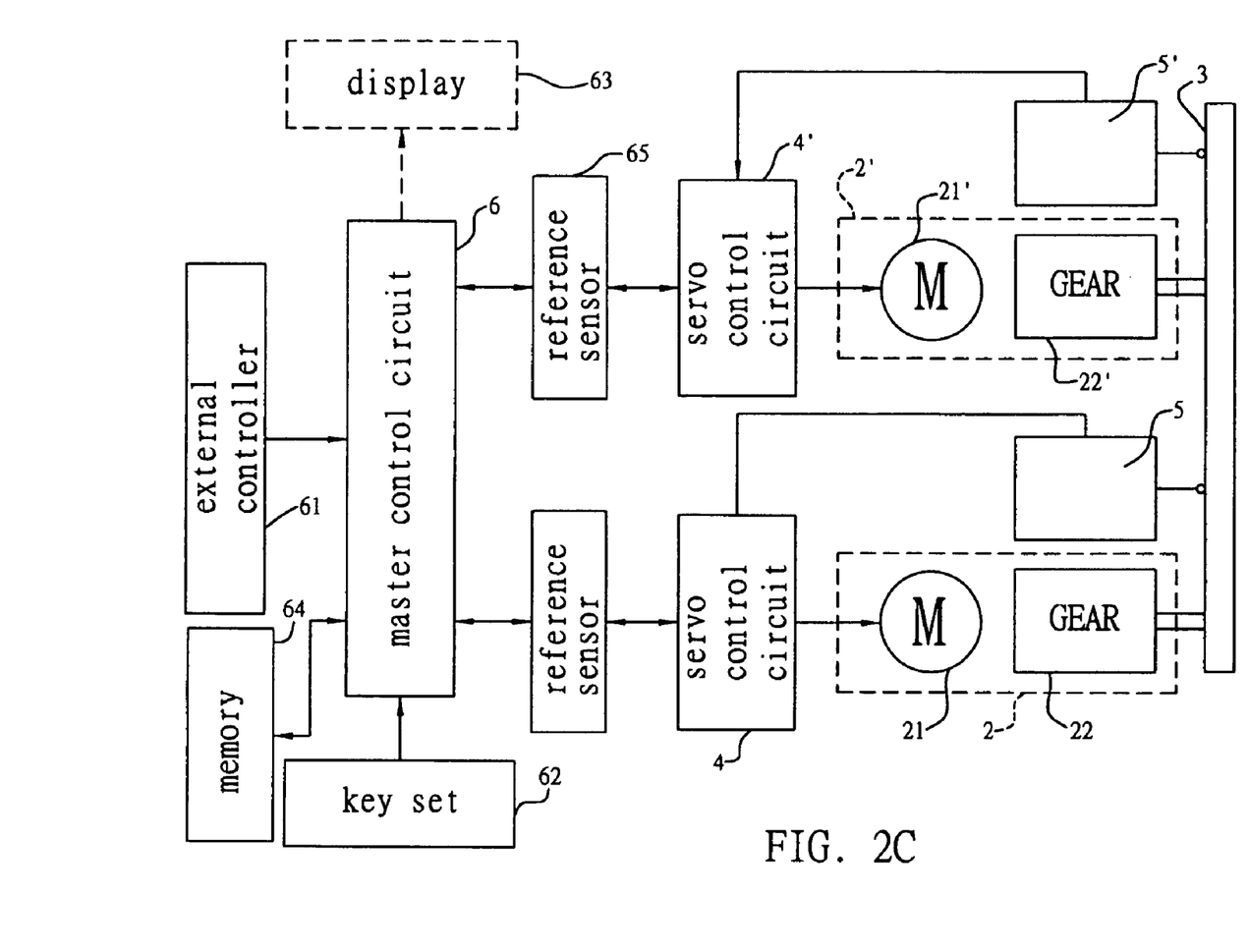
FIG. 2C is a schematic block diagram showing basic architecture of the auto-adjusting electric rear-view mirror according to a further preferred embodiment of the present invention.

Referring to FIG. 2C, the input ports of the servo control circuits 4, 4' are respectively coupled to reference sensors 65 (such as variable resistance, etc.). The input ports of the servo control circuits 4, 4' take a setting value of the reference sensors 65 as a reference value. The servo control circuits 4, 4' compare the feedback signal from the sensor members 5, 5' with the reference value to drive the driving mechanisms 2, 2' according to the comparison result. Therefore, the angle setting parameters of the mirror member 3 can be directly adjusted by modifying the setting value of the reference sensors 65.

Figure 2D:
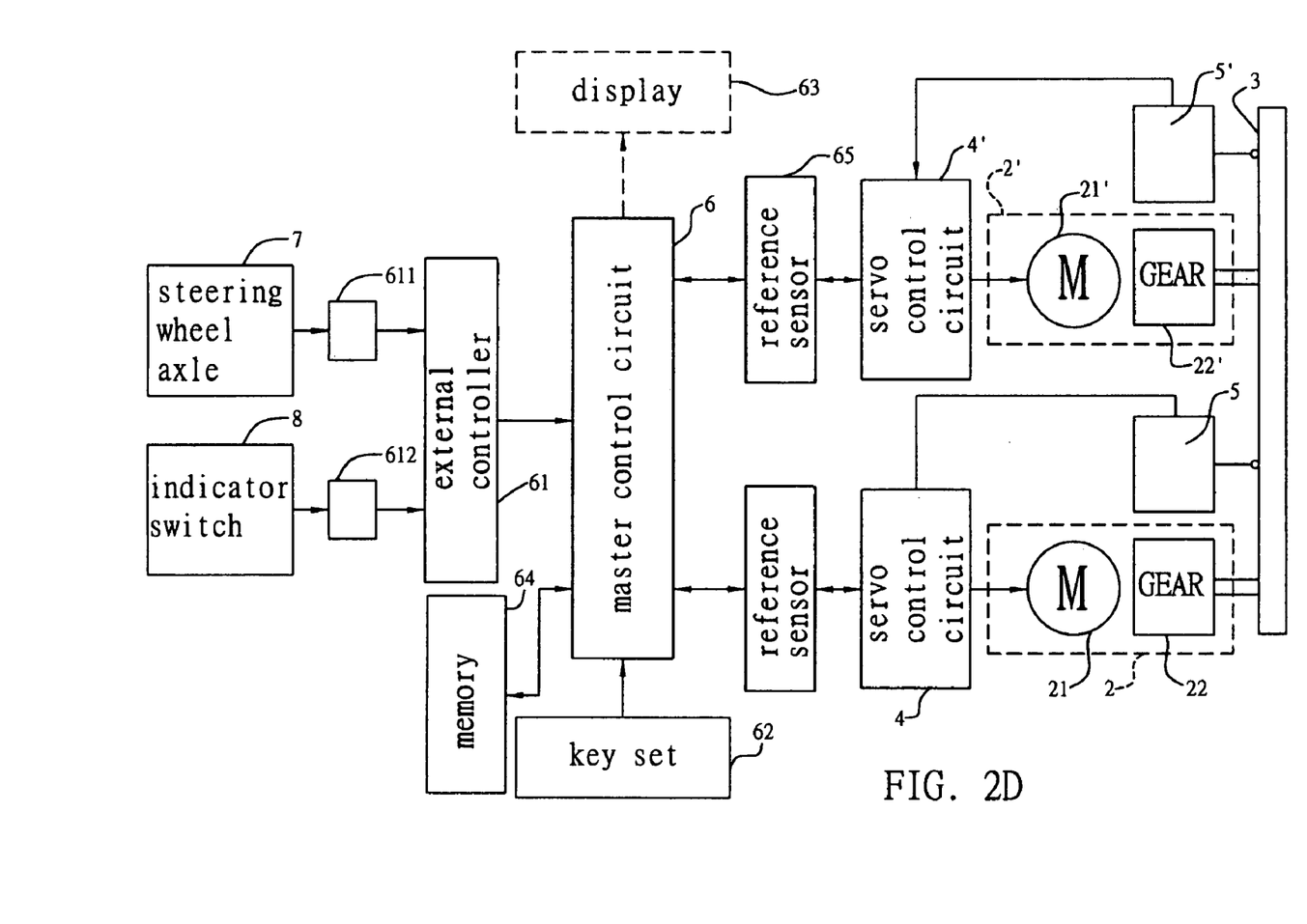
FIG. 2D is a schematic block diagram showing basic architecture of the auto-adjusting adjusting electric rear-view mirror according to a further preferred embodiment of the present invention.

Referring to FIG. 2D, it shows a block diagram of basic architecture of the auto-adjusting electric rear-view mirror according to a further preferred embodiment of the present invention. The input ports of the servo control circuits 4, 4' are respectively coupled to reference sensors 65 (such as variable resistance, etc.). The input ports of the servo control circuits 4, 4' take a setting value of the reference sensors 65 as a reference value. The servo control circuits 4, 4' compare the feedback signal from the sensor members 5, 5' with the reference value to drive the driving mechanisms 2, 2' according to the comparison result. This allows the angle setting parameters of the mirror member 3 to be directly adjusted by modifying the setting value of the reference sensors 65. Moreover, the external controller 61 connected to the master control circuit 6 is further coupled to a first sensor 611 that is connected to a steering wheel axle 7, and to a second sensor 612 that is connected to an indicator switch 8. The first sensor 611 is used to sense a variation of a turning angle of the steering wheel axle 7. The second sensor 612 is used to sense operating indication of the indicator switch 8. The first and second sensors 611, 612 respectively produce a feedback signal according to the sensing result and transmit the feedback signal to the external controller 61. The external controller 61 correspondingly outputs a control signal to the master control circuit 6 according to the feedback signal, and the master control circuit 6 transmits the control signal to the servo control circuits 4, 4' to drive positive or negative rotation of the motors 21, 21' of the driving mechanisms 2, 2'. As a result, when a driver of the car operates the steering wheel to change the turning angle of the steering wheel axle 7 for turning or backing the car and/or operates the indicator switch 8 to turn on the indicator, the mirror member 3 of the rear-view mirror would automatically turn or deflect to provide a wider view angle during turning or backing of the car, so as to prevent visually blind spots during turning or backing of the car and improve the driving safety.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An auto-adjusting electric rear-view mirror, comprising:
    at least two driving mechanisms for driving a mirror member of the rear-view mirror to turn and change a view angle thereof;
    a servo control circuit coupled to each of the driving mechanisms and for controlling positive and negative rotation of the corresponding driving mechanism;
    a sensor member coupled to the servo control circuit and for sensing a positional variation of the mirror member of the rear-view mirror to output a feedback signal to the servo control circuit, so as to allow the servo control circuit to compare the feedback signal with a signal from an input port of the servo control circuit to output a control signal to the corresponding driving mechanism;
    a master control circuit coupled to the servo control circuit and an external controller, so as to allow the servo control circuit to directly control the corresponding driving mechanism according to a control signal transmitted by the external controller, wherein the external controller is further connected to at least one of a first sensor coupled to a steering wheel axle for sensing a variation of a turning angle of the steering wheel axle and outputting a feedback signal to the external controller and a second sensor coupled to an indicator switch for sensing operating indication of the indicator switch and outputting a feedback signal to the external controller; and
    a key set coupled to the master control circuit and for inputting a control signal to the master control circuit.

2. The auto-adjusting electric rear-view mirror of claim 1, wherein each of the driving mechanisms comprises a motor and a gear set.

3. The auto-adjusting electric rear-view mirror of claim 1, wherein the sensor member comprises a positional sensor or a counting sensor.

4. The auto-adjusting electric rear-view minor of claim 3, wherein the sensor member comprises variable resistance.

5. The auto-adjusting electric rear-view mirror of claim 1, wherein the master control circuit includes a memory for storing a setting value, such that the servo control circuit compares a value of the feedback signal from the sensor member with the setting value received via the signal from the input port of the servo control circuit so as to output the control signal to the corresponding driving mechanism and allow the rear-view mirror to return to a preset position.

6. The auto-adjusting electric rear-view mirror of claim 1, wherein the master control circuit is connected to a display.

7. The auto-adjusting electric rear-view mirror of claim 6, wherein the display is a monochromatic liquid crystal display or a color liquid crystal display.

8. An auto-adjusting electric rear-view mirror, comprising:
    at least two driving mechanisms for driving a mirror member of the rear-view mirror to turn and change a view angle thereof;
    a servo control circuit coupled to each of the driving mechanisms and for controlling positive and negative rotation of the corresponding driving mechanism; a reference sensor electrically connected to an input port of the servo control circuit and for producing a reference signal;
    a sensor member coupled to the servo control circuit and for sensing a positional variation of the mirror member of the rear-view mirror to output a feedback signal to the servo control circuit, so as to allow the servo control circuit to compare the feedback signal with the reference signal received by the input port of the servo control circuit to output a control signal to the corresponding driving mechanism; a master control circuit coupled to the servo control circuit and an external controller, so as to allow the servo control circuit to directly control the corresponding driving mechanism according to a control signal transmitted by the external controller, wherein the external controller is further connected to at least one of a first wheel axle for sensing a variation of a turning angle of the steering wheel axle and outputting a feedback signal to the external controller and a second sensor coupled to an indicator switch for sensing operating indication of the indicator switch and outputting a feedback signal to the external controller; and
    a key set coupled to the master control circuit and for inputting a control signal to the master control circuit.

9. The auto-adjusting electric rear-view mirror of claim 8, wherein each of the driving mechanisms comprises a motor and a gear set.

10. The auto-adjusting electric rear-view mirror of claim 8, wherein the sensor member comprises a positional sensor or a counting sensor.

11. The auto-adjusting electric rear-view mirror of claim 10, wherein the sensor member comprises variable resistance.

12. The auto-adjusting electric rear-view mirror of claim 8, wherein the master control circuit includes a memory for storing a setting value, such that the servo control circuit compares a value of the feedback signal from the sensor member with the setting value received via the reference signal by the input port of the servo control circuit so as to output the control signal to the corresponding driving mechanism and allow the rear-view mirror to return to a preset position.

13. The auto-adjusting electric rear-view mirror of claim 8, wherein the reference sensor comprises variable resistance.

14. The auto-adjusting electric rear-view minor of claim 8, wherein the master control circuit is connected to a display.

15. The auto-adjusting electric rear-view mirror of claim 14, wherein the display is a monochromatic liquid crystal display or a color liquid crystal display.

* * * * *

UNITED STATES PATENT AND TRADEMARK OFFICE
CERTIFICATE OF CORRECTION

PATENT NO. : 7,049,780 B2 Page 1 of 1
APPLICATION NO. : 10/995232
DATED : May 23, 2006
INVENTOR(S) : Chang It is certified that error appears in the above-identified patent and that said Letters Patent is hereby corrected as shown below:

Title page, item [54]
In the title:

Please delete "DOOR LOCK TRANSMISSION ELEMENT" and replace it with --AUTO-ADJUSTING ELECTRIC REAR-VIEW MIRROR--

In column 1, line 1:

Please delete "DOOR LOCK TRANSMISSION ELEMENT" and replace it with --AUTO-ADJUSTING ELECTRIC REAR-VIEW MIRROR--

Signed and Sealed this

First Day of August, 2006

JON W. DUDAS
*Director of the United States Patent and Trademark Office*